UNITED STATES PATENT OFFICE.

WILLIAM L. WOODS, OF WASHINGTON, DISTRICT OF COLUMBIA.

PLASTIC COMPOSITION AND PROCESS OF COMBINING SAME.

SPECIFICATION forming part of Letters Patent No. 552,269, dated December 31, 1895.

Application filed March 22, 1894. Renewed May 28, 1895. Serial No. 551,009. (No specimens.)

*To all whom it may concern:*

Be it known that I, WILLIAM L. WOODS, a citizen of the United States, residing at Washington city, in the District of Columbia, have invented certain new and useful Improvements in Plastic Compositions and in Processes of Combining the Same; and I do hereby declare the following to be a full, clear, and exact description of the invention, such as will enable others skilled in the art to which it appertains to make and use the same.

The object of my invention is to produce a composition of matter for use in the plastic arts which can be used either as a binding substance for concreting lithic substances and the metallic earths and oxides, or, in the fine arts, without the addition of coarser material, for the production of casts, imitation bronzes, &c., and for the manufacture of various utensils for use in the arts where such utensils require material in their construction possessing the characteristics of plasticity, elasticity, and resistance to acids. I attain these objects by combining silica, magnesia, mineral wax and crude sulphur, with or without the addition of a filler of coarser material—such as broken stone, sand, gravel, or any lithic substance, or the metallic earths or oxides. The process of effecting the combination of these materials in such a manner as to avoid and overcome the difficulties which inhere in the use of sulphur as a binder for various other substances, as ordinarily practiced, constitutes one of the salient features of my invention, and, together with the composition of matter which is best adapted to my purpose, will be hereinafter described, and particularly pointed out in the claims.

Heretofore the great difficulty experienced in the employment of sulphur as a constituent element in plastic compounds consisted in the fact that in all such compounds the sulphur, sooner or later, lost its power of coherence and proved to be an element of disintegration, causing the article to become tender and brittle and eventually useless for any practical purpose requiring strength and hardness of material. Another difficulty which has seemed to be inherent in plastic compounds of which sulphur forms an element consists in the tendency of the articles manufactured from such compounds to crack in cooling, owing to the rapid crystallization of the mass after it is poured into the molds. I overcome all of these difficulties by the process and the combination of materials which I will now proceed to describe.

I first prepare the magnesia and silica to be used by grinding them to an impalpable powder, or as nearly so as may be, and sifting them through bolting-cloth of not less than twenty mesh. I then place the pulverized material in a dry-oven and expel all moisture by heat, when it is ready to use. I then prepare the sulphur by melting it and pouring it into cold water. I repeat this operation many times, or until it becomes a waxy and pasty mass. I then treat the mineral wax, which may be either ozocerite, gilsonite, or wax-tailings, (although I prefer the first-named,) in precisely the same way as I treat the sulphur.

I combine the above-described materials, prepared as stated, by melting them together in a suitable close vessel and thoroughly incorporating them by heat at a temperature of about 300° Fahrenheit, constantly stirring the mass. I then gradually raise the temperature to 500°, or as much higher as it will bear without ignition, and continue to cook it at the higher temperature until the sulphurous smell ceases. At this state the mass becomes exceedingly viscid and tenacious. I then press it into cakes, bricks, or pigs, when it is in a condition to be stored for future use.

The proportions of the above-named materials which produce the best results are substantially as follows, although they may be varied within certain limits, and I do not, therefore, limit my invention or claims to the proportions named: magnesia, thirty (30) parts; silica, sixty (60) parts; sulphur, sixty (60) parts; mineral wax, three to ten (3 to 10) parts, according to quality. Ozocerite being the best for my purpose, the first-named proportions of that material may be employed. Pigs or bricks of this material may be stored for any length of time and used by remelting, or it may be used when it is first compounded.

The materials to be mixed with and concreted by my plastic I generally reduce to a powdered state and free them from moisture, but it will bind and concrete any stony material of any size and shape, from sand to rubble. The mixing must, of course, be done while the plastic is in a melted state, and the mass must be thoroughly incorporated. It can then be molded or pressed into any desirable shape, and it will readily free itself from the molds, as it slightly contracts when cooling, rendering the impression clean-cut and sharp. The plastic itself without the addition of a filler of coarse material will copy the texture, to the minutest detail, of any surface upon which it is poured or pressed.

The rationale of this invention may be stated as follows: The liability to crack, which characterizes most compounds into which sulphur enters as an element, is counteracted in this composition by its slowness in cooling, and this property is due to the mixture of silica and magnesia which enters into it. Its immunity from disintegration is due primarily to the peculiar process of manipulating the sulphur, by which it is deprived of its decomposing-gases, while the addition of mineral wax neutralizes the caustic properties of any of the disintegrating elements which I may have failed to volatilize, and at the same time imparts an additional plasticity and elasticity to the compound. I am thus enabled to take advantage of the well-known good qualities of sulphur as a concreting agent without impairing its crystallizing power and at the same time counteract that tendency to disintegration which has heretofore proved so destructive in the plastic arts.

My plastic and its concretes will withstand all natural thermal changes, and may be used in any place and for any purpose where it is not subjected to combustive heat. It is exceedingly hard, but yields to the file and other steel instruments. It is waterproof, and resists all acids except hydrofluoric. Its field of usefulness in the fine arts and in the mechanic arts is very wide. It is far superior to plaster-of-paris in the plastic arts as to sharpness and beauty of finish, durability, &c. It can be made to imitate bronze and other metals by mixture, and it will take colors and modifications as high as the tertiaries, and its surfaces may be painted, tinted, or gilded in the most lasting way, and any color may be imparted to the mass by the admixture of suitable pigments. It is very valuable in the manufacture of water-ducts, sewer-pipes, washtubs, bath-tubs, kitchen-sinks, acid-tubs, and electrical-battery jars, and it is particularly valuable for ornate architectural work, casts, bas-reliefs, &c., also for monuments, burial-caskets, and sarcophagi, and for grave-linings and all underground work it is imperishable.

Having thus described my invention, what I claim, and desire to secure by Letters Patent, is—

1. A composition of matter consisting of silica, magnesia, sulphur and mineral wax, substantially as and for the purpose set forth.

2. A composition of matter consisting of silica, magnesia, sulphur, mineral wax, and a filler, substantially as set forth.

3. A composition of matter consisting of silica, sixty parts; magnesia, thirty parts; sulphur, sixty parts; and mineral wax, three to ten parts, substantially as set forth.

4. A composition of matter consisting of silica, magnesia, sulphur and ozocerite, substantially as and for the purpose set forth.

5. The process herein described of mixing or compounding a composition of matter consisting of silica, magnesia, sulphur and mineral wax, which consists of grinding the silica and the magnesia to a fine powder, melting the sulphur and pouring it into cold water, and then melting the mineral wax and sulphur together and adding the silica and magnesia, substantially as set forth.

6. The process herein described of mixing or compounding silica, magnesia, sulphur and mineral wax, which consists in grinding the silica and magnesia to a fine powder and expelling the moisture therefrom by heat; repeatedly melting the sulphur and pouring it into cold water, preparing the mineral wax the same as the sulphur and then remelting the sulphur and mineral wax and thoroughly incorporating the various ingredients together, substantially as set forth.

7. The process herein described of compounding silica, magnesia, sulphur and mineral wax, which consists in grinding the silica and magnesia to a powder and expelling the moisture therefrom, repeatedly melting the sulphur and the mineral wax and pouring them into cold water, remelting the sulphur and the mineral wax at a temperature of about three hundred (300) degrees Fahrenheit, adding the silica and magnesia and thoroughly incorporating the same, and then gradually increasing the temperature to about five hundred (500) degrees Fahrenheit, and continuing to cook the mass until the sulphurous fumes are expelled, substantially as and for the purpose set forth.

In testimony whereof I affix my signature in presence of two witnesses.

WILLIAM L. WOODS.

Witnesses:
CHAS. B. HUDSON,
JOHN E. RUEBSAM.